(12) United States Patent
Early et al.

(10) Patent No.: US 9,205,353 B2
(45) Date of Patent: Dec. 8, 2015

(54) SCUM REMOVAL SYSTEM FOR LIQUIDS

(71) Applicants: Daniel M. Early, New Castle, VA (US); Scott F. Easter, Huddleston, VA (US)

(72) Inventors: Daniel M. Early, New Castle, VA (US); Scott F. Easter, Huddleston, VA (US)

(*) Notice: Subject to any disclaimer, the term of this patent is extended or adjusted under 35 U.S.C. 154(b) by 124 days.

(21) Appl. No.: 14/058,136

(22) Filed: Oct. 18, 2013

(65) Prior Publication Data

US 2014/0110335 A1    Apr. 24, 2014

Related U.S. Application Data

(60) Provisional application No. 61/716,849, filed on Oct. 22, 2012.

(51) Int. Cl.

| F04F 1/06 | (2006.01) |
|---|---|
| F04F 1/18 | (2006.01) |
| F04F 1/00 | (2006.01) |
| C02F 1/40 | (2006.01) |
| B01D 21/24 | (2006.01) |
| B01D 21/00 | (2006.01) |
| F04B 1/06 | (2006.01) |

(52) U.S. Cl.
CPC ........ B01D 21/2433 (2013.01); B01D 21/0018 (2013.01); F04B 1/06 (2013.01); F04F 1/06 (2013.01); F04F 1/18 (2013.01); C02F 1/40 (2013.01); C02F 2303/12 (2013.01)

(58) Field of Classification Search
CPC .. B01D 21/0018; B01D 21/2433; C02F 1/40; C02F 1/00; C02F 9/00; C02F 2201/00; F04F 1/06; F04F 1/18
See application file for complete search history.

(56) References Cited

U.S. PATENT DOCUMENTS

| 3,234,880 | A | * | 2/1966 | Hampton | 417/90 |
|---|---|---|---|---|---|
| 3,239,067 | A | * | 3/1966 | Hikes et al. | 210/521 |
| 3,400,822 | A | | 9/1968 | McKeown | |
| 3,444,821 | A | | 5/1969 | Walsh | |
| 3,919,090 | A | * | 11/1975 | Shaffer | 210/523 |
| 4,030,521 | A | | 6/1977 | Karlsson | |
| 4,473,467 | A | * | 9/1984 | Marcotte | 210/153 |
| 7,294,254 | B2 | | 11/2007 | White et al. | |
| 8,137,557 | B2 | | 3/2012 | Ladouceur | |
| 2007/0166171 | A1 | * | 7/2007 | Kondo | 417/118 |
| 2010/0230347 | A1 | * | 9/2010 | Haslem | 210/523 |
| 2011/0168611 | A1 | | 7/2011 | Early et al. | |
| 2012/0097590 | A1 | | 4/2012 | Early et al. | |

* cited by examiner

*Primary Examiner* — Katherine Zalasky
*Assistant Examiner* — Benjamin Lebron
(74) *Attorney, Agent, or Firm* — Richard C. Litman

(57) ABSTRACT

The scum removal system for liquids is adaptable to wastewater treatment facilities, aquaculture facilities, oil spills, and/or other environments where the removal of a thin, buoyant layer of material from a liquid surface is desired. The system incorporates a geyser pump having one or more inlet pipes, with the inlet pipe(s) collectively having a larger diameter than the discharge pipe. This assures that the volume of water in the inlet pipe is always less than that in the discharge pulse, thus assuring that a steady, constant flow of liquid flows into the inlet opening to assure a uniform inertial flow of the floating contaminants into the inlet. The top of the inlet pipe (s) may be vertically adjustable for variable liquid level. The geyser pump may be submerged within the liquid or may be installed external to the liquid tank with the submerged inlet pipe communicating with the external pump.

3 Claims, 5 Drawing Sheets

SCUM REMOVAL SYSTEM FOR LIQUIDS

CROSS-REFERENCE TO RELATED APPLICATION

This application claims the benefit of U.S. Provisional Patent Application Ser. No. 61/716,849, filed Oct. 22, 2012.

BACKGROUND OF THE INVENTION

1. Field of the Invention

The present invention relates generally to water treatment systems, and particularly to a scum removal system for liquids wherein a constant flow is maintained into the intake pipe to the geyser pump to draw surface scum from the liquid.

2. Description of the Related Art

Quiescent bodies of impure or contaminated water or other liquids will often have a buoyant layer of material floating thereon, with removal of this buoyant layer being desirable for environmental and/or other reasons. An example of such is often found in the conventional secondary clarifier tank or lagoon in a wastewater treatment plant or facility. The function of such secondary clarifier tanks is to allow the wastewater to become quiescent, so solids may settle out. However, this also allows buoyant materials to rise to the surface of the water, in the form of scum. Such scum can impede discharge performance of pumps in the system, and also generally result in undesirable odors due to the organic decomposition occurring in such scum residue.

Accordingly, various means of scum removal have been developed in the past. Generally, two different principles have been applied to scum removal in wastewater treatment facilities and other situations where scum removal is desired. One such scum removal principle utilizes flat skimmer blades or paddles to remove the scum from the surface mechanically. These mechanical skimmer systems tend to require a fair amount of maintenance and can require considerable power to operate. Another scum removal system utilizes a pneumatic airlift pump to draw the scum into an inlet at the surface of the water. Airlift pumps operate by introducing air into the bottom of a substantially vertical tube disposed within the water, with the air reducing the density of the water or other liquid in the tube and causing the air and liquid mix to rise to the top of the tube where it is ejected from the tube. Airlift pumps have the advantages of simplicity and lack of moving parts in the immersed pump assembly, but produce relatively weak suction for the power required and thus limit the effective surface area that may be treated by such a pump. Such airlift pumps are also prone to clogging under certain circumstances, due to the relatively slow movement of liquid and air through the discharge pipe.

A more recent development has been the geyser pump, which operates by accumulating a relatively large charge of air at the lower end of the pump riser, which results in the air charge being released as a single volume to travel up the riser or discharge pipe of the pump. This increases the periodic lifting force up the discharge pipe to carry an equal amount of liquid (and contaminants, if any) up the discharge pipe with each pulse of air. As in the case of the airlift pump, the rate of flow may be adjusted by adjusting the flow of incoming air to the pump. The relatively powerful lifting action of the geyser type pump is generally used to lift sediment from the bottom of a tank or pond, or to circulate the water or liquid from the bottom of the tank or pond. The relatively powerful action also tends to prevent clogging or buildup of foreign matter within the discharge pipe.

However, the cyclic or pulsing operation of such geyser pumps results in a corresponding cyclic or pulsing flow to the pump inlet. This may be of no great concern where the inlet is submerged, but this pulsing flow has precluded the use of the geyser pump principle for use in scum removal from the surface of a liquid, even though the relatively greater lifting power of the geyser pump provides significant advantages otherwise. Accordingly, there has been no motivation to provide an inlet opening at the water or liquid surface to draw floating scum into the geyser pump for discharge to another area, or to provide vertical adjustment for such an inlet to allow for varying liquid levels.

Thus, a scum removal system for liquids solving the aforementioned problems is desired.

SUMMARY OF THE INVENTION

The scum removal system for liquids is adaptable to waste water treatment facilities, aquaculture facilities, oil spills, and/or other environments where the removal of a thin, buoyant layer of material from the surface of a body of water or other liquid is desired. The scum removal system incorporates a geyser type pump with an inlet disposed at the surface of the liquid, to draw floating scum from the surface and into the inlet to be pumped to another location by the geyser pump. Smooth and continuous flow into the inlet is provided by having an inlet pipe of significantly larger diameter than the outlet pipe of the pump. The larger diameter inlet pipe provides an internal volume larger than that of the discharge line, assuring that the inlet pipe can never fill completely between pump input cycles to stop flow or produce backflow at the inlet opening. This results in continual flow into the inlet opening to maintain the inertia of the inflow to the inlet and avoid pulses that would otherwise cyclically push back the inflow of liquid and scum into the inlet to destroy the inertial flow.

The larger diameter inlet pipe may comprise a single pipe of larger diameter than the outlet or discharge pipe, or a plurality of inlet pipes collectively having a larger diameter than the outlet or discharge pipe. The inlet pipe or pipes preferably includes a vertically adjustable inlet opening, allowing the height of the opening to be adjusted as necessary for varying liquid level. At least the inlet and discharge pipes are constructed of plastic pipe or other non-corrosive materials, with the pump also preferably being constructed of such non-corrosive material. The pump may thus be installed within the body of liquid being treated, or externally to the body of liquid with the intake and discharge pipes communicating with the body of liquid and the pump accordingly.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The scum removal system for liquids incorporates a geyser type pump with suitable inlet and outlet pipes to provide a continuous inlet flow in order to avoid backups at the inlet that would disrupt the surface flow of liquid therein. The system further includes an adjustable height inlet to allow for varying liquid levels. Several embodiments are disclosed.

Figure 1:
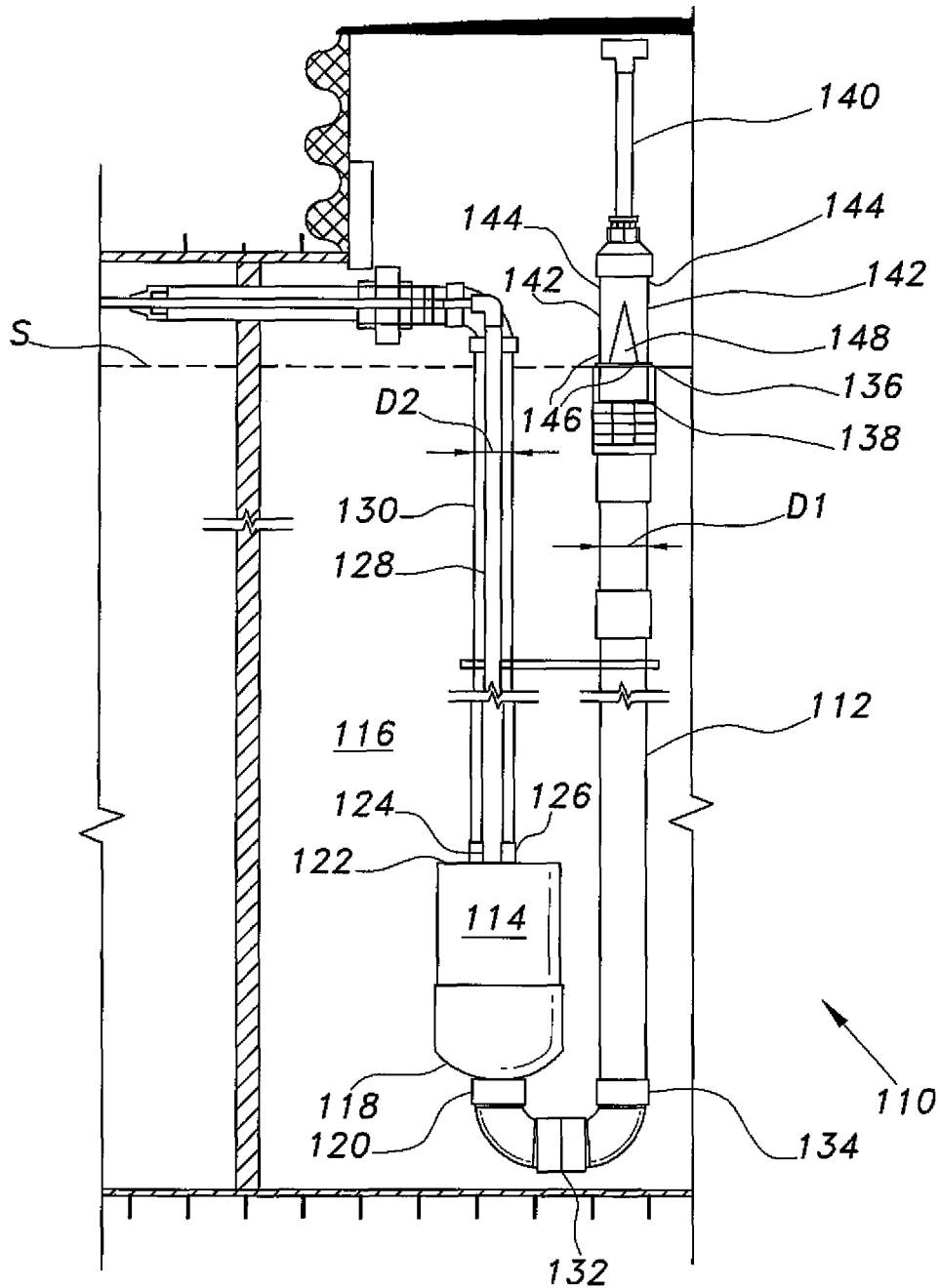
FIG. 1 is an environmental elevation view of a first embodiment of a scum removal system for liquids according to the present invention, shown within a settling tank and illustrating its basic components and structure.

FIG. 1 of the drawings illustrates a first embodiment 110 of the scum removal system incorporating a single inlet pipe 112 and a geyser pump 114 immersed within the settling tank 116. The geyser pump 114 has an essentially closed lower end 118 with the exception of the bottom intake inlet 120, and an opposite upper end 122 with an upper pneumatic inlet 124 and an upper discharge outlet 126. The geyser pump 114 contains no moving parts, but rather accepts gas (universally air) under pressure from a remote pump or other source of air or gas pressure through the pneumatic intake pipe 128 extending from the upper pneumatic inlet 124. The air builds in volume within the geyser pump 114, and results in a sudden discharge of air (and liquid and perhaps solids entrained therewith, if any) through the discharge outlet 126 and its discharge pipe 130.

The conventional geyser pump has an open lower end or inlet to draw liquids and any solids entrained therein, into the bottom of the pump for discharge through the discharge pipe. Such a conventional geyser pump is illustrated schematically in prior art FIG. 5, and discussed further below. The inlet of the conventional geyser pump is not situated above the pump, but instead comprises an open lower pump end. However, the inlet pipe 112 of the present scum removal system 110 and its other embodiments have their inlet pipes, e.g., the inlet pipe 112, connected to the bottom intake inlet 120 of the pump 114 by a generally U-shaped coupling 132 (e.g., two elbows joined end-to-end as shown, or other means of accomplishing such a 180 degree change in orientation) having a pump connection end common with the bottom intake inlet 120 of the pump 114 and an opposite intake pipe connection end 134. The intake pipe 112 extends generally vertically upward from the intake pipe connection 134 of the U-coupling 132, to an inlet 136 above the geyser pump 114 at the surface S of the liquid within the tank 116.

The scum removal system 110 draws liquid and any scum floating thereon from the surface S of the liquid by means of the geyser pump 114 and the inlet 136 of the inlet pipe 112 at the surface S of the liquid. Constant flow of liquid into the inlet 136 is enabled by providing a relatively large diameter inlet pipe 112 in comparison to the discharge pipe 130. It will be noted in FIG. 1 that the inlet pipe 112 has a diameter D1, while the discharge pipe 130 has a somewhat smaller diameter D2. For example, the diameter D1 of the inlet pipe 112 may be on the order of 1.5 times the diameter D2 of the discharge pipe 130, to provide an inlet pipe cross-sectional area on the order of 2.25 times the cross-sectional area of the discharge pipe 130. These relative diameters and cross-sectional areas are exemplary, and other pipe sizes may be used as desired so long as the inlet pipe diameter D1 is sufficiently larger than the discharge pipe diameter D2.

The difference in diameter results in a constant flow into the inlet pipe 112, as its larger internal volume cannot fill between discharges in the smaller diameter discharge pipe 130. This results in a constant flow of liquid from the surface S of the settling tank 116, into the inlet 136 of the inlet pipe 112. This constant flow results in constant momentum of the surface layer of liquid and any scum floating thereon into the inlet 136 of the inlet pipe 112, rather than intermittent flow as a smaller diameter inlet pipe periodically fills between discharges of the pump through the discharge pipe. The periodic filling of the conventional smaller diameter inlet pipe results in no flow into the inlet pipe, with the momentum of the surface flow (and any scum floating thereon) stopping as the inlet pipe is filled. In fact, there is generally some slight backflow when the pipe becomes filled under such circumstances, which tends to wash away from the pipe inlet any scum that may be floating atop the liquid. When the liquid level in the inlet pipe lowers as a discharge of air and liquid occurs through the discharge pipe, liquid once again begins to flow toward and into the inlet pipe. However, the acceleration of the liquid mass (and any scum floating thereon) takes some finite amount of time to return to the pipe inlet and begin to flow into the inlet pipe. The constant flow provided by the larger diameter inlet pipe and geyser pump of the present system provides much greater efficiency in scum removal than earlier systems.

The liquid level within the tank 116 (or settling pond, etc.) may vary over some period of time. Accordingly, the intake or inlet end 136 of the inlet pipe 112 is vertically adjustable. This is accomplished by means of a vertically adjustable telescoping assembly 138, such as a telescopic repair coupling available for the repair of a broken section of pipe. Such repair couplings may be inserted between the ends to replace the broken or damaged section, and adjusted by telescoping the assembly to fit the span between the broken ends. In the present invention, the telescopic repair coupling is connected at one end to the upper end of the fixed inlet pipe 112, with the opposite end of the repair coupling becoming the vertically adjustable inlet opening 136 of the inlet pipe. Other telescoping assemblies for adjusting the level of the inlet end 136 to be level with or very slightly below the liquid surface S may be provided alternatively.

The telescoping inlet assembly 138 is provided with an upwardly extending extension handle 140, to allow the height of the inlet opening 136 to be adjusted without need to reach into the water or other liquid within the tank 116. The extension handle 140 is connected to the telescoping inlet assembly 138 by cylindrical segments 142 of pipe extending from an adapter at the base of the extension handle 140 to the inlet end 136 of the telescoping assembly 138. These segments 142 have relatively wider upper ends 144 than their lower ends 146, with the segments 142 defining diametrically opposed inlet openings 148 therebetween. The relatively narrower lower ends 146 of the pipe segments 142 result in relatively wider areas at the lower ends of the openings 148 to improve inflow at the lower ends where they attach to the upper end of the telescoping assembly 138.

Figure 2:
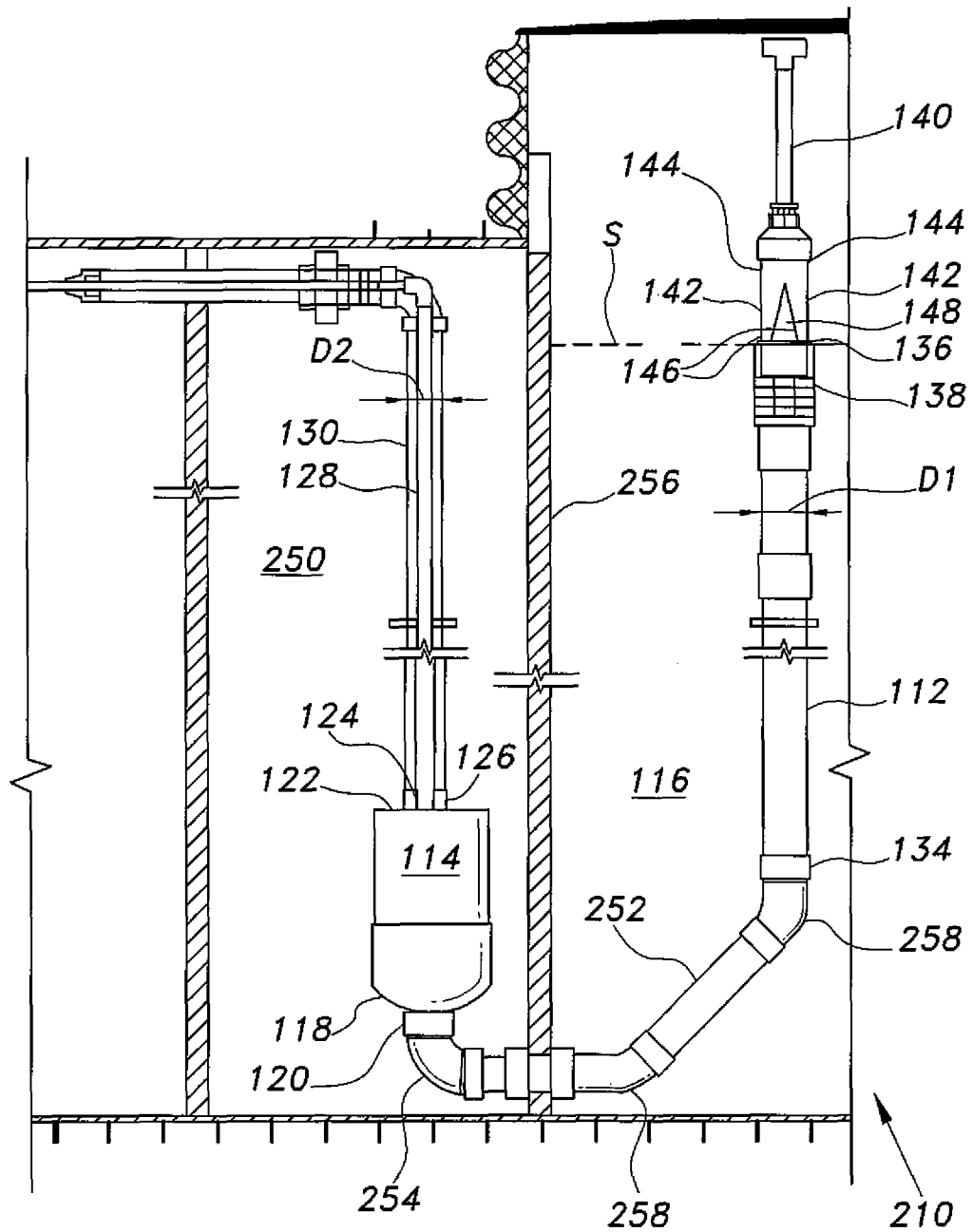
FIG. 2 is an environmental elevation view of a second embodiment of a scum removal system for liquids according to the present invention, wherein the pump is disposed in a compartment external to the liquid tank.

FIG. 2 illustrates an alternative embodiment 210, wherein the geyser pump 114 is situated in a dry area or compartment 250 external to the settling tank 116. Most of the components of the scum removal system 110 of FIG. 2 are identical to those like components in the embodiment 110 of FIG. 1, i.e., the inlet pipe 112, geyser pump 114, settling tank 116, pump lower end 118 and bottom intake inlet 120, pump upper end 122, upper pneumatic inlet 124 and upper discharge outlet 126, intake pipe 128, discharge pipe 130, intake connection 134 to the inlet pipe 12, inlet 136 of the inlet pipe 112, telescoping inlet assembly 138, extension handle 140, and the various components and features 142 through 148 of the structure between the extension handle 140 and the inlet 136 of the inlet pipe 112. However, the U-shaped inlet coupling 132 of the embodiment 10 of FIG. 1 is replaced with an elongate length of angled pipe 252 between two 45° fittings 258 to form an expanded coupling or connection between the pump 114 and the inlet pipe 112 and its components. This allows the inlet pipe 112 and its components to be situated within the tank 116, while the geyser pump 114 is located in a dry area or compartment 250 external to the settling tank 116, separated from the settling tank by a wall or bulkhead 256. As all of the inflow and outflow of the geyser pump 114 is by means of inlet and discharge pipes 112, 128, and 130, the pump 114 need not be located within the liquid tank 116 with the inlet pipe 112, but may be separated from the liquid tank insofar as practicable, if so desired.

Figure 3:
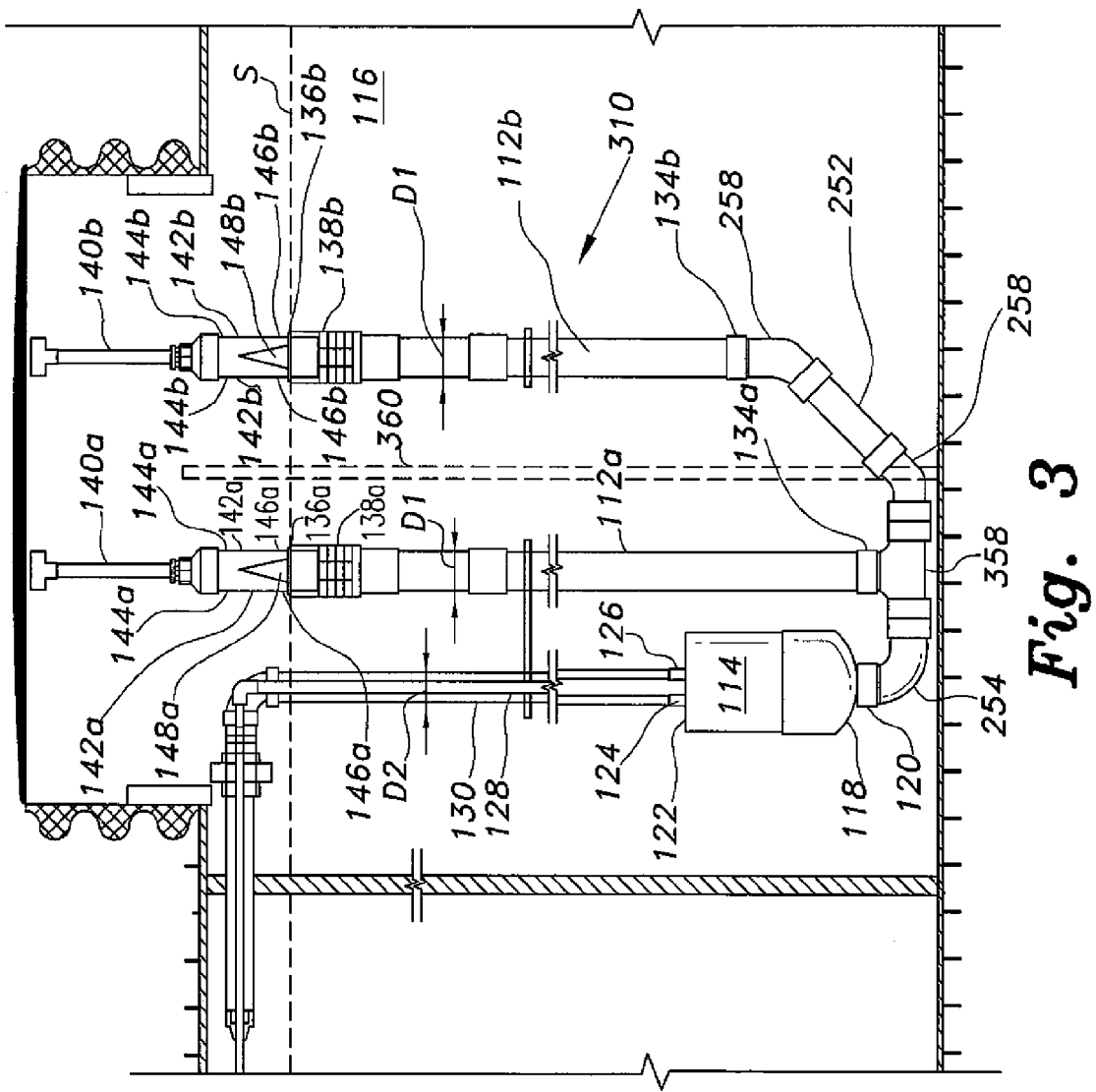
FIG. 3 is an environmental elevation view of a third embodiment of a scum removal system for liquids according to the present invention, wherein plural intake pipes are provided to the pump.

FIG. 3 of the drawings illustrates another alternative embodiment designated as scum removal system 310, wherein two inlet pipe assemblies 112a and 112b are provided. The system 310 of FIG. 3 is similar to the system 110 of FIG. 1, in that the geyser pump 114 is located within the liquid tank 116. However, two separate inlet pipes 112a and 112b provide liquid flow to the pump 114. The various components of the two inlet pipes 112a and 112b are essentially the same as the corresponding components of the single inlet pipe 112 of the embodiments 110 and 210 of FIGS. 1 and 2, but are designated by lower case letters a and b to indicate their installation with the corresponding inlet pipe 112a or 112b. The first inlet pipe 112a is connected at its intake connector end 134a to the geyser pump 114 by a tee fitting 358 installed between the elbow 254 and the 45° fitting 258, with the second inlet pipe 112b being connected at its intake connection end 134b to a second 45° fitting 258 and connector pipe 252 to the tee 358. In this manner, the collective cross-sectional area of the multiple inlet pipes 12a and 12b may be increased over the area of a single pipe 12, without increasing the diameter of either of the pipes 12a or 12b over the diameter of the single pipe 12. It will be seen that additional inlet pipes as desired may be connected to the pump 114 in a similar manner, using conventional pipe fittings. Different pipe components may be used to further separate the inlets 136a and 13 6b from one another at the liquid surface S, as desired. A baffle 360 (shown in broken lines in FIG. 3) may be disposed between the two inlet pipes 112a and 112b, as desired. The various components of the geyser pump 114, i.e., the bottom 118 and its intake inlet 120, the top 122 and its pneumatic inlet 124 and discharge outlet 126, and the associated pneumatic inlet pipe 128 and discharge pipe 130, are essentially as shown in FIGS. 1 and 2 and described further above. While the geyser pump 114 is shown as being installed within the liquid tank 116 in FIG. 3, it will be seen that it may be installed externally to the tank 116 if so desired, generally as shown in FIG. 2.

Figure 4C:
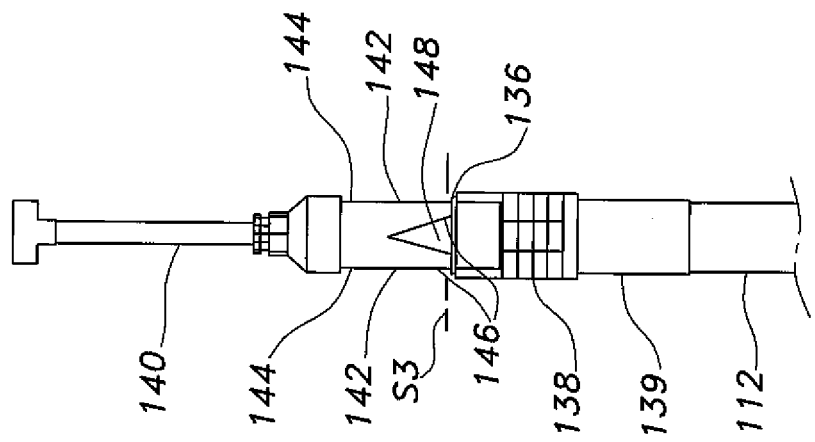
FIG. 4C is a detailed partial elevation view of the adjustable height inlet of the scum removal system for liquids according to the present invention, showing the inlet height adjusted upward for a higher water level.
Figure 4B:
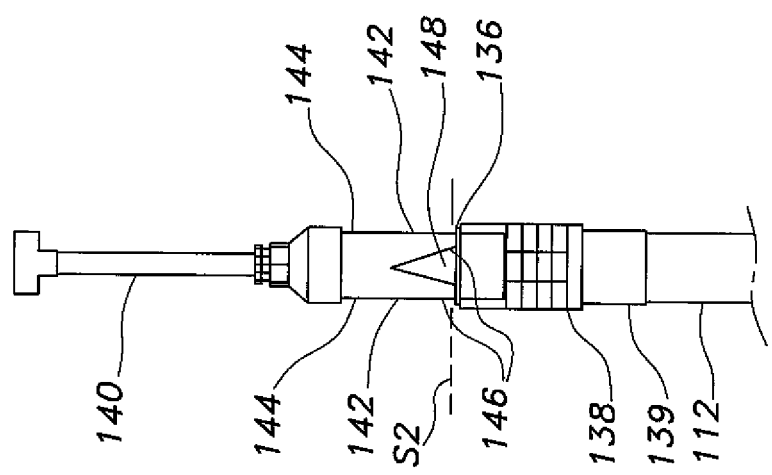
FIG. 4B is a detailed partial elevation view of the adjustable height inlet of the scum removal system for liquids according to the present invention, showing the inlet height adjusted for a medial water level.
Figure 4A:
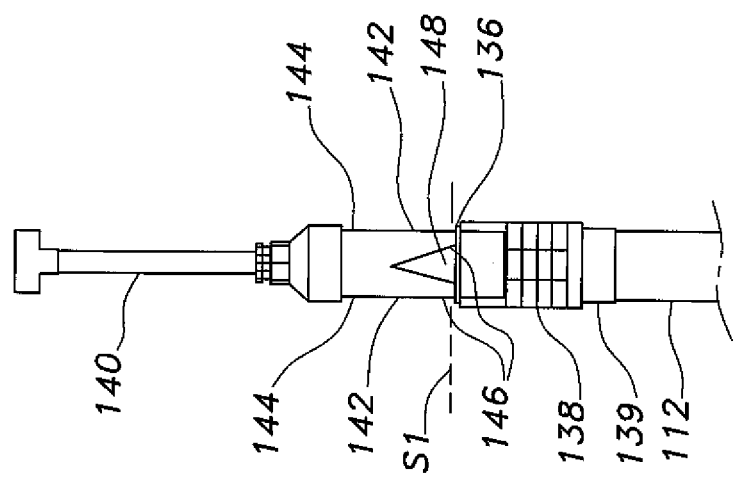
FIG. 4A is a detailed partial elevation view of the adjustable height inlet of the scum removal system for liquids according to the present invention, showing the inlet height adjusted downwardly for a lower water level.

FIGS. 4A through 4C illustrate the adjustment of the telescoping inlet assembly 138 for different liquid levels. The various upper end components 140 through 148 of each inlet pipe 112 are identical in each of the FIGS. 4A through 4C, with only their relative heights changing between the three FIGS. 4A through 4C. FIG. 4A illustrates a liquid level or surface S1 at a relatively low level in comparison to the liquid levels S2 and S3 respectively of FIGS. 4B and 4C. Accordingly, the telescoping inlet assembly 138 of FIG. 4A is adjusted to a relatively low level to place the lower edge of the inlet opening 136 at or very slightly below the liquid level surface S1, with relatively little of the lower collar 139 of the telescoping assembly 138 being exposed. FIG. 4B illustrates the telescoping assembly 138 adjusted for a medial height liquid level surface S2, with somewhat more of the collar 139 being exposed. In FIG. 4C, the liquid level surface S3 is relatively high, necessitating the raising of the telescoping assembly 138 to a higher level upon its lower collar 139 to expose more of the lower collar 139.

Figure 5:
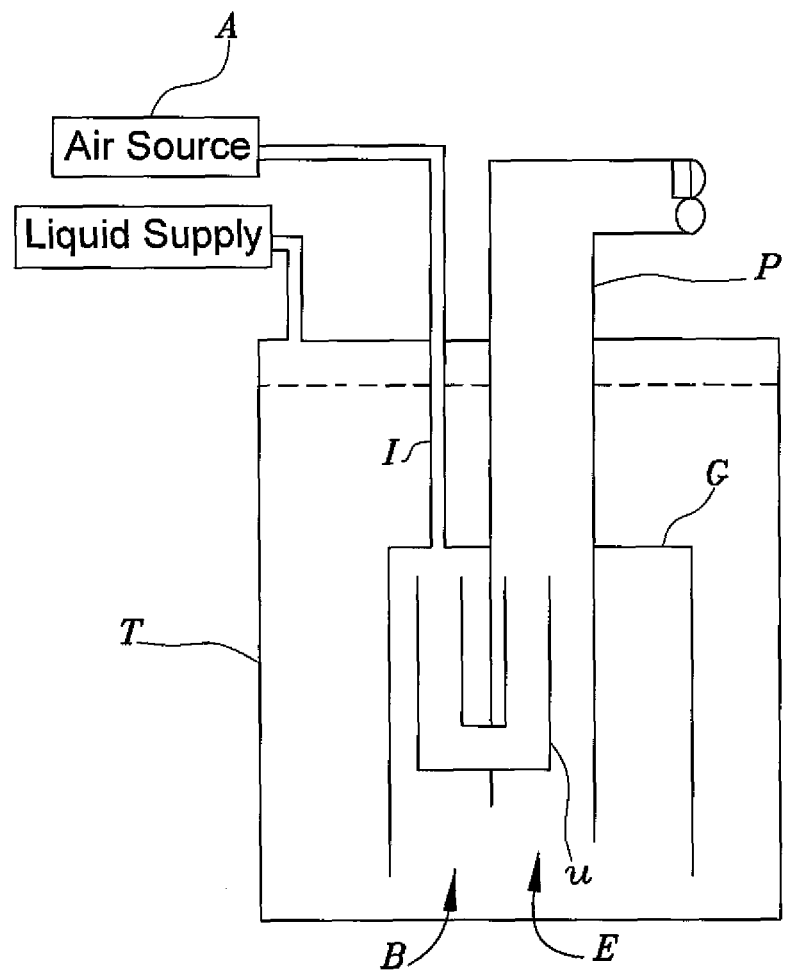
FIG. 5 is a schematic elevation view of a prior art geyser pump for use with the scum removal system for liquids according to the present invention.

FIG. 5 provides a schematic diagram of the internal structure of a conventional geyser pump G. In FIG. 5, the geyser pump G is installed in a liquid tank T, corresponding generally to the tank 116 of FIGS. 1 through 3 of the drawings. The geyser pump G has an open bottom end B, allowing the open lower end E of the discharge pipe P within the open bottom end B of the pump to receive liquid (and perhaps sediment) from the bottom of the tank T. An air source A (pressurized air or gas from a compressor, etc.) delivers air or gas to the geyser pump G through an inlet pipe I. The air is supplied to an internal U-shaped pipe U. Due to the U-shaped pipe, air remains trapped in the air cylinder until it reaches a predetermined pressure, and then it is suddenly released through the discharge pipe P, expelling liquid and associated particulates.

As the geyser pump has no mechanical components or electrical connection, the geyser pump is not affected by a dry run condition should water levels fall below the top of the intake pipe or should the intake be raised above the water level. The air would continue to flow out of the discharge and/or intake pipe until the water enters the intake once again. A conventional submersible electric pump is subject to burn-out in such a run dry condition. As the conventional geyser pump G has no upper inlet to receive liquid from near the surface, it cannot draw scum from the surface, as provided by the present scum removal system in its various embodiments.

Accordingly, the present scum removal system with its inlet at or slightly below the surface of the liquid and its larger diameter inlet pipe or pipes relative to its discharge pipe diameter, provides a means for assuring continuous flow into the inlet to preclude backflow and subsequent repulsion of liquid and scum floating thereon from the inlet. The result is a smoothly flowing input of surface liquid and scum into the inlet in a continuous flow, providing a considerably more efficient scum removal system than developed in the past.

It is to be understood that the present invention is not limited to the embodiments described above, but encompasses any and all embodiments within the scope of the following claims.

We claim:
1. A scum removal system for liquids, comprising:
a geyser pump having an upper end and a lower end, wherein the lower end includes a bottom surface of the geyser pump;
a pneumatic inlet and a discharge outlet disposed in the upper end of the geyser pump;
a discharge pipe extending from the discharge outlet, wherein the discharge pipe has a first diameter;
an intake inlet disposed in the lower end of the geyser pump, wherein the intake inlet defines the sole opening in the bottom surface of the geyser pump;

a substantially U-shaped coupling extending from the intake inlet of the geyser pump, the substantially U-shaped coupling having a pump connection end and an intake pipe connection end; and at least one intake pipe extending from the intake pipe connection end of the U-shaped coupling, wherein the at least one intake pipe has a second diameter, the second diameter being at least 1.5 times the first diameter, further wherein the at least one intake pipe extends vertically upward from the U-shaped coupling, the at least one intake pipe having an inlet end disposed above the geyser pump, wherein the at least one intake pipe has an upper end having a vertically adjustable inlet disposed thereon and an extension handle extending upward from the inlet, wherein the inlet comprises a cylindrical segment defining diametrically opposed first and second openings, each of the openings having a narrow upper end and a wide lower end.

2. The scum removal system for liquids according to claim 1, wherein the at least one intake pipe comprises a plurality of intake pipes communicating with the intake inlet of the geyser pump.

3. The scum removal system for liquids according to claim 1, further comprising a settling tank, the at least one intake pipe being disposed therein, the geyser pump being disposed external to the settling tank.

* * * * *